(12) United States Patent
Heian

(10) Patent No.: US 6,183,242 B1
(45) Date of Patent: Feb. 6, 2001

(54) ROTARY KILN FOR FORMING LIGHTWEIGHT AGGREGATE FROM FLYASH AND SEWAGE SLUDGE

(75) Inventor: Glenn A. Heian, Franklin, WI (US)

(73) Assignee: Svedala Industries, Inc., Waukesha, WI (US)

( * ) Notice: Under 35 U.S.C. 154(b), the term of this patent shall be extended for 0 days.

(21) Appl. No.: 09/384,018

(22) Filed: Aug. 26, 1999

(51) Int. Cl.[7] ........................................ F27D 3/16
(52) U.S. Cl. ........................ 432/11; 432/14; 432/145; 432/200; 432/201
(58) Field of Search ........................ 432/11, 14, 108, 432/115, 116, 117, 145, 149, 200, 201, 152; 110/226, 246, 347

(56) References Cited

U.S. PATENT DOCUMENTS

| | | | |
|---|---|---|---|
| 3,879,193 | 4/1975 | Günter | 75/35 |
| 3,945,624 * | 3/1976 | Rossi | 266/20 |
| 3,990,865 * | 11/1976 | Cybriwsky et al. | 48/197 R |
| 4,055,390 | 10/1977 | Young | 432/14 |
| 4,198,761 | 4/1980 | Minerbe | 34/10 |
| 4,318,713 * | 3/1982 | Lee et al. | 48/203 |
| 4,469,509 | 9/1984 | Fischer et al. | 75/36 |
| 4,734,166 | 3/1988 | Angelo, II | 202/100 |
| 4,782,768 * | 11/1988 | Lee et al. | 432/117 |
| 4,793,269 * | 12/1988 | Dezubay et al. | 432/116 |
| 5,057,009 | 10/1991 | Nechvatal et al. | 432/14 |
| 5,230,617 * | 7/1993 | Klein et al. | 432/116 |
| 5,342,442 | 8/1994 | Nechvatal et al. | 106/409 |
| 5,476,990 * | 12/1995 | Hittner et al. | 588/201 |
| 5,549,059 | 8/1996 | Nechvatal et al. | 110/346 |
| 5,843,204 * | 12/1998 | Ishikawa et al. | 266/145 |

* cited by examiner

Primary Examiner—Denise L. Ferensic
Assistant Examiner—Gregory A. Wilson
(74) Attorney, Agent, or Firm—Andrus, Sceales, Starke & Sawall, LLP

(57) ABSTRACT

A method for producing a lightweight aggregate by treating flyash and sewage sludge. The flyash and sewage sludge are mixed together and agglomerated into pellets. The pelletized agglomerate is fed into a rotary kiln in a direction that is co-current with the flow of fuel and air through the kiln. The rotary kiln includes at least one port air zone near the infeed end of the rotary kiln to introduce port air beneath the bed of pelletized agglomerate feed stock flowing through the rotary kiln. The introduction of port air beneath the material bed causes the volatized combustible matter to burn in the bed of material, which oxidizes the outer shell of the pelletized agglomerate. As the pelletized agglomerate continues to travel through the rotary kiln, bloating occurs within the interior of the material and results in the formation of the lightweight aggregate material.

15 Claims, 4 Drawing Sheets

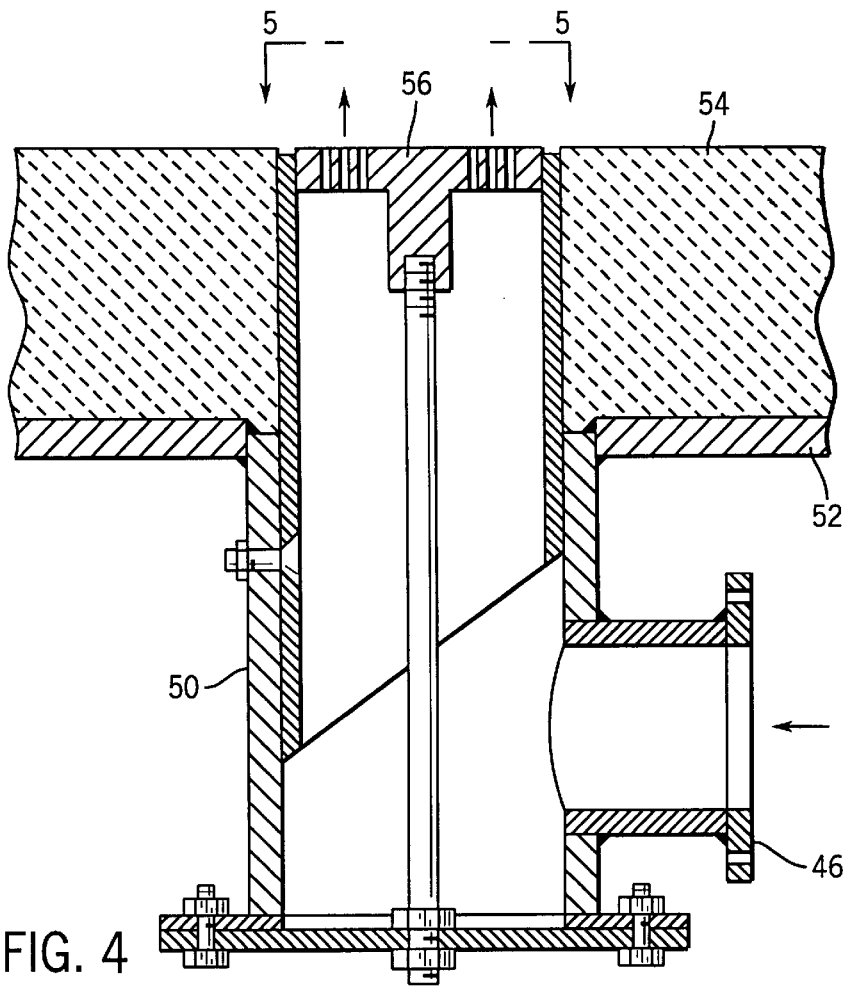
FIG. 4
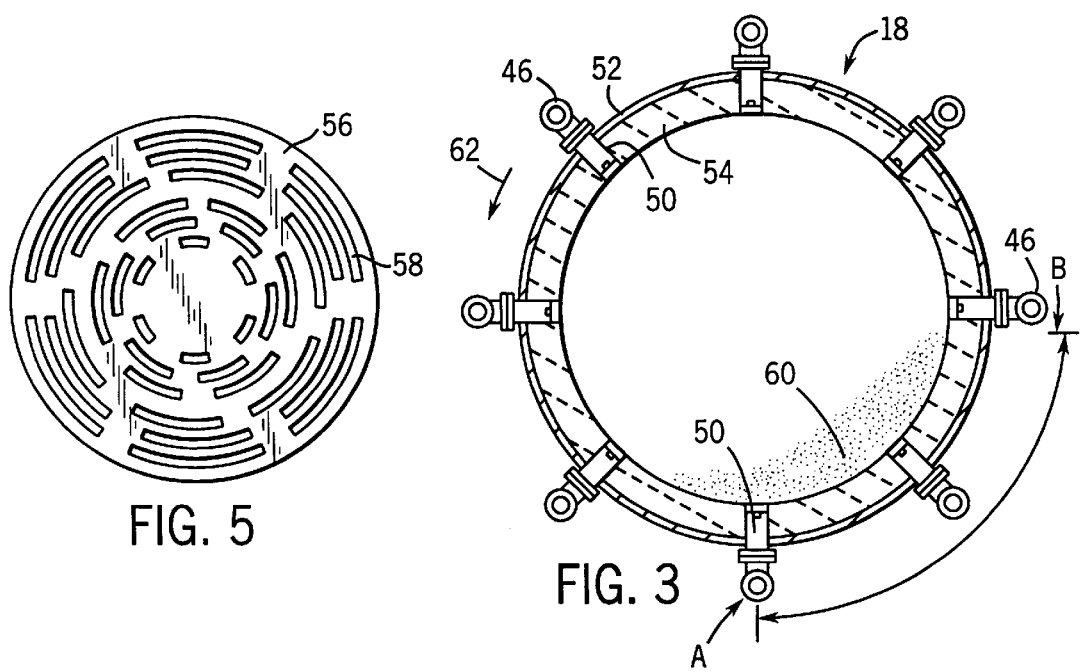
FIG. 5
FIG. 3

ROTARY KILN FOR FORMING LIGHTWEIGHT AGGREGATE FROM FLYASH AND SEWAGE SLUDGE

BACKGROUND OF THE INVENTION

The present invention relates to the treatment of flyash and sewage sludge to produce a lightweight aggregate. More specifically, the present invention relates to a method of processing a pelletized agglomerate of sewage sludge and flyash in a rotary kiln by the introduction of port air into the bed of pelletized agglomerate in the rotary kiln.

Flyash is a particulate by-product produced from the burning of coal, and particularly powdered bituminous coal. Coal burning power plants typically produce very large quantities of flyash that must be disposed of in an environmentally acceptable manner. In recent years, the cost of placing flyash in a landfill has significantly increased such that the option of treating the flyash to form a commercially desirable product has become a more and more commercially viable prospect. The resultant product formed from treated flyash is typically used as a lightweight aggregate in the formation of concrete structures. In the process of treating the flyash, a typical step involves heating a flyash mixture in a rotary kiln.

Sewage sludge is the by-product of the treatment of waste water. Sludge is the settled solids accumulated and subsequently separated from the liquid stream during various phases of the waste water treatment process. The sludge may be from primary or secondary settling, or may be waste-activated sludge. The sludge may be raw sludge, digested sludge or de-watered sludge. The characteristics of the sludge will vary depending upon the stage of treatment from which it is drawn and also depending on whether it has received treatment, such as by digestion. However, a common characteristic of the sludge is that it contains significant organic materials.

Sludge has been generally disposed of by incineration followed by land disposal of the inert ash or by lagooning, landfilling, spreading on land for fertilizer for soil conditioning and ocean dumping where permitted. As with flyash, sewage sludge presents a considerable problem of disposal in an economical and environmentally sound manner.

In accordance with Nechvatal et al. U.S. Pat. Nos. 5,057,009 and 5,342,442, the disclosures of which are incorporated herein by reference, a method for producing a lightweight aggregate by treating a combination of flyash and sewage sludge is known. In accordance with the process shown in these two patents, sewage sludge and flyash is agglomerated into pellets which are coated and dried. The dried pellets are introduced into a rotary kiln in a direction that is co-current with the flow of fuel and air through the kiln. The pellets within the kiln experience complete calcination and various degrees of pyrolizing and sintering to produce a nodular material having a low density but with a hard, porous structure. The resultant nodular product, after cooling, can be used as a lightweight aggregate for concretes, masonry, or insulation purposes, can be used for other commercial purposes, or can otherwise be disposed of in an environmentally sound and economical manner.

Although the process taught in the Nechvatal et al. patents has proved to be an effective method of producing a lightweight aggregate from flyash and sewage sludge, it is an object of the present invention to provide an improved rotary kiln that produces a better product using less external fuel during the passage of the pelletized feed stock through the rotary kiln. It is an additional object of the invention to increase the combustion of the material fuel in the pelletized feed stock near the infeed end of the rotary kiln such that the material fuel contained within the feed stock increases the temperature within the rotary kiln. It is an additional object of the invention to provide a method of forming lightweight aggregate from flyash by mixing the flyash with sewage sludge that provides a major portion of the fuel value needed in a rotary kiln treatment of the flyash.

SUMMARY OF THE INVENTION

The present invention involves the mixture of sewage sludge with flyash, agglomerating the mixture into a feed stock such as by pelletizing, and indurating the agglomerated feed stock in a rotary kiln. The resultant nodular product, after cooling, can be used as a lightweight aggregate for concretes, masonry, or insulation purposes.

The rotary kiln of the present invention includes at least one port air zone that introduces a supply of port air beneath the material bed of feed stock passing through the rotary kiln. The port air zone includes a series of port air conduits spaced around the outer circumference of the rotary kiln that each have a plurality of individual ports extending into the interior of the rotary kiln. Each of the port air conduits includes a tipper valves that is selectively opened and closed such that port air is introduced into the interior of the rotary kiln only when each individual port is beneath the material bed.

The introduction of port air beneath the material bed in the rotary kiln promotes combustion of the material fuel contained within the pelletized agglomerate feed stock. Combustion of the material fuel contained within the pelletized agglomerate feed stock by the introduction of port air occurs within the material bed and allows the amount of fuel fed to the burner to be decreased while still burning off a sufficient amount of the combustible material within the rotary kiln.

The port air is introduced beneath the material bed near the infeed end of the rotary kiln. Near the infeed end of the kiln, the burner initially dries the agglomerate feed stock and burns the combustible gas above the tumbling material bed. The agglomerate feed stock is preheated as it begins to move away from the infeed end of the kiln. The introduction of the port air near the infeed end of the co-current flow of fuel and air provides the oxygen to burn the volatile fuel leaving the agglomerate feed stock. The increase in temperature of the feed stock near the infeed end of the rotary kiln oxidizes the outer shell of the pelletized agglomerate. Once the outer shell of the pelletized agglomerate feed stock has been oxidized, the continued burning of the internal carbon causes bloating within the individual pellets of agglomerate. In this manner, the individual pellets of the agglomerate are prevented from sticking together while creating a lightweight aggregate having the desired properties.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a cross-section view through the rotary kiln illustrating the introduction of port air beneath the bed of agglomerate feed stock;

FIG. 4 is a section view taken through an air inlet into the rotary kiln;

FIG. 5 is a top plan view of the grate positioned over the inlet to the rotary kiln, as taken along line 5—5 of FIG. 4.

DETAILED DESCRIPTION OF THE INVENTION

Figure 1:
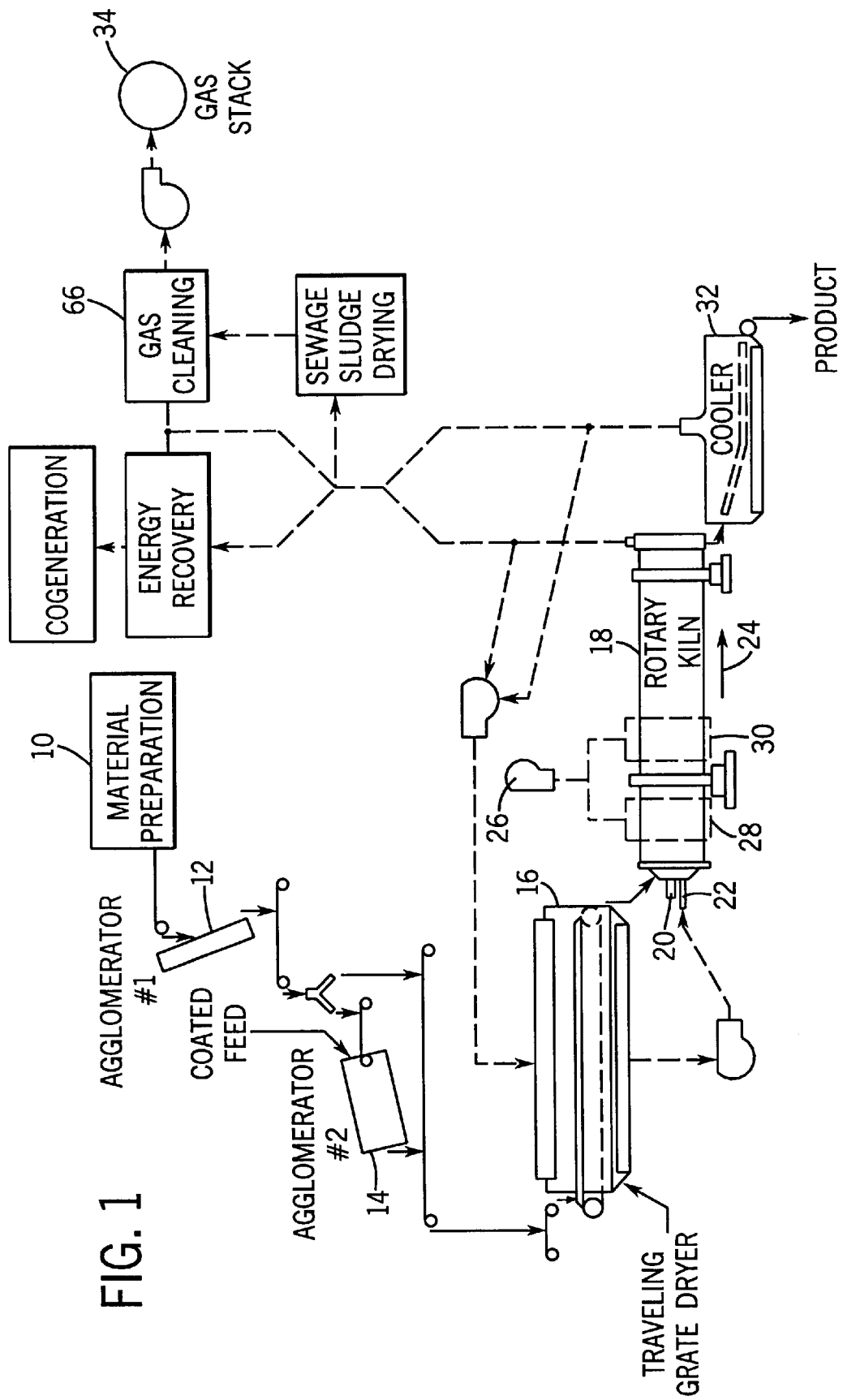
FIG. 1 illustrates the arrangement of an apparatus suitable for carrying out the present invention, including a rotary kiln having the ability to introduce port air beneath the supply of pelletized agglomerate feed stock passing therethrough.

Referring first to FIG. 1, flyash and sewage sludge are initially mixed in a material preparation area 10 which may include batch or continuous mixing. The flyash and sewage sludge are mixed in a proportion of about 35%–99% flyash by dry weight to about 1%–65% sewage sludge by dry weight. For proper agglomeration, it may be necessary and desirable to add a binder, such as bentonite, to assist in formation of the mixed particles. Such a binder should not exceed about 20% by total dry weight of the resulting mixture and preferably does not exceed about 4%.

The blended flyash and sewage sludge mixture is fed to a first agglomerator 12 which agglomerates the mixture into small pellets in the range of about ⅛ to ¾ inches in diameter. The green pellets produced in the first agglomerator 12 are fed to a second agglomerator 14 in which the pellets may be coated to prevent the green pellets from sticking to each other during heat treatment in the rotary kiln. The preferable coating is a low loss-on-ignition flyash. Alternatively, dolomite, limestone, portland cement or other material may be used as a coating.

Although the green pellets leaving the second agglomerator 14 are formed from a combination of flyash and sewage sludge, it should be understood that other types of fuel-rich waste products, such as paper mill sludge, could be substituted for the sewage sludge or added into the mixture while operating within the scope of the present invention. Paper mill sludge, like sewage sludge, contains a significant amount of organic material fuel and binds well with flyash.

Upon leaving the second agglomerator 14, the green pellets are dried on a traveling grate dryer 16. The green pellets are dried to a moisture content that is preferably below 5%. The dried pellets are then introduced as feed stock into a rotary kiln 18 constructed in accordance with the present invention. The dried pellets are fed into the same end of the rotary kiln 18 from which external fuel is introduced through a burner 20 and through which air is introduced through an air lance 22. The pellets slowly travel through the inclined rotary kiln 18 in the same direction (i.e. co-currently) with the direction of flow of hot gases through the kiln, as illustrated by arrow 24.

The rotary kiln 18 of the present invention includes a port air fan 26 that introduces port air beneath the accumulated pelletized feed stock in a first port air zone 28 and a second port air zone 30. The specific process occurring within the first port air zone 28 and the second port air zone 30 will be described in greater detail below.

The product leaving the rotary kiln 18 is fed into a cooler 32, which can be water or air cooled, to bring the product temperature down to a temperature where it can be further handled and stockpiled. The heat from the cooler 32 may be recovered and used for various purposes including drying the green pellets in the traveling grate dryer 16. Unused gases will pass to a gas cleanup and exit the gas stack 34.

The sewage sludge adds significantly to the material fuel value of the agglomerate feed stock entering into the rotary kiln 18 and significantly reduces the amount of external fuel, such as natural gas, that is required to fire the kiln through the burner 20. For example, the amount of natural gas that will be required to be added to the rotary kiln 18 to produce the same product rate in short tons per hour would be reduced by about 85% using the blend of flyash and sewage sludge as compared with all flyash. Further, there is considerable fuel value available in the kiln off-gas and its heat energy may be used to dry the sewage sludge prior to mixing, to dry the green pellets, and for energy recovery for cogeneration or other purposes.

Figure 2:
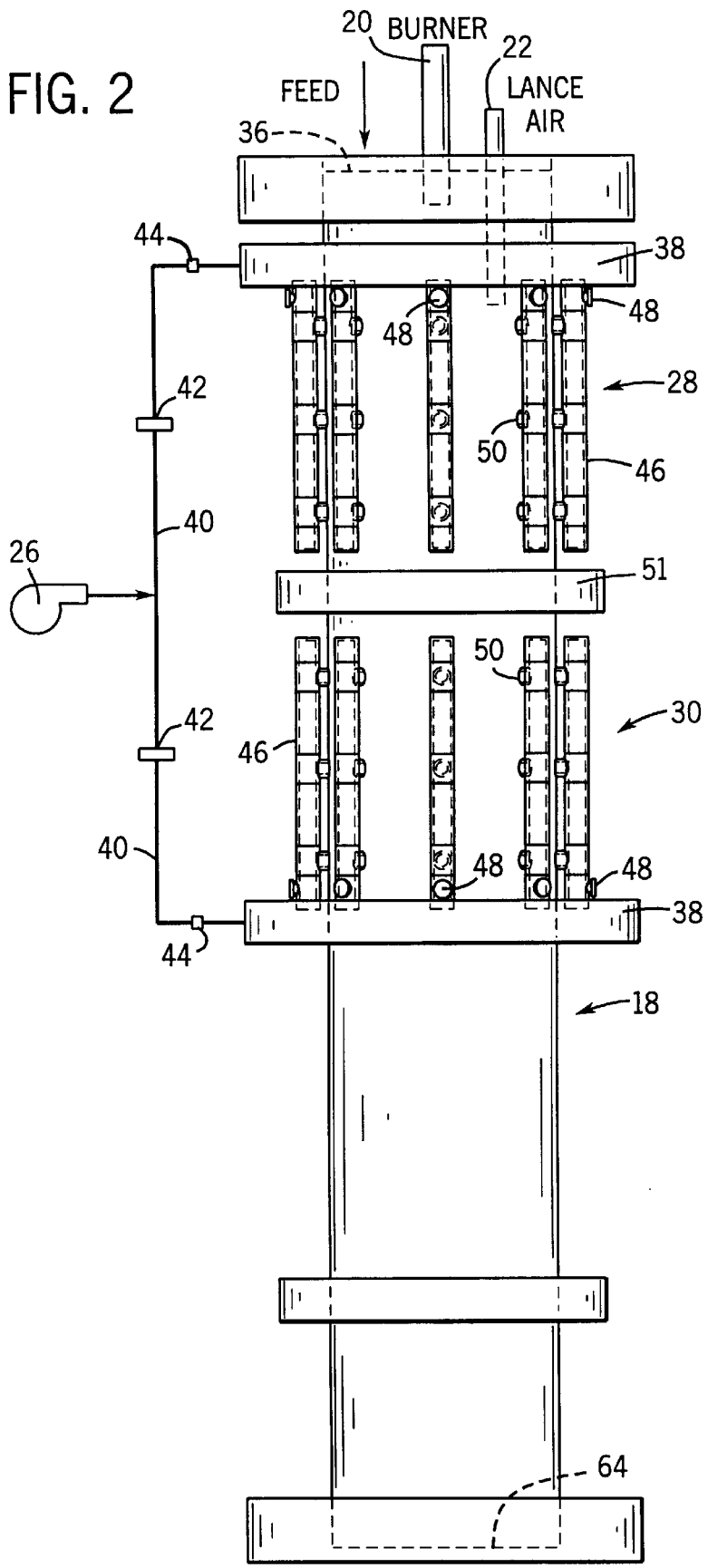
FIG. 2 is a schematic illustration of the rotary kiln of FIG. 1 illustrating the introduction of port air into the rotary kiln near its infeed end.

Referring now to FIGS. 2 and 3, port air is introduced near an infeed end 36 of the rotary kiln 18 by the port air fan 26. In the embodiment of the invention shown, the port air is introduced near the infeed end 36 of the rotary kiln 18 in a first port air zone 28 and the second port air zone 30. Each of the first and second port air zones 28 and 30 include a main air manifold 38 that extends around the outer circumference of the rotary kiln 18. Each of the manifolds 38 receives the supply of air from the port air fan 26 through an air passageway 40. The flow of air to each of the first and second port air zones 28 and 30 are controlled by a control damper 42 positioned in the air passageway 40 between the port air fan 26 and the respective air manifold 38. Each air flow control damper 42 is controlled by a damper actuator which controls the amount of air entering into the respective air zone 28 or 30 based upon a signal from a flow meter 44 positioned between the control damper 42 and the respective manifold 38. The combination of the two air flow control dampers 42 allows differing amounts of port air to be supplied to the two port air zones 28 and 30.

Each of the port air zones 28 and 30 includes a series of port air conduits 46 spaced around the outer circumference of the rotary kiln 18. Each of the port air conduits 46 extends parallel to the longitudinal length of the rotary kiln 18 and is coupled to the manifold 38 such that air from the port air fan 26 can flow through the air passageway 40, through the manifold 38, and into the port air conduits 46. In the preferred embodiment of the invention, either eight or twelve individual port air conduits 46 can be spaced around the outer circumference of the rotary kiln 18.

Each of the port air conduits 46 includes a tipper valve 48 and a plurality of ports 50 that extend from the port air conduit 46 into the interior of the rotary kiln 18, as best shown in FIG. 3. As can be seen in FIG. 3, each port 50 extends through an outer shell 52 and a refractory lining 54 for the rotary kiln 18. Referring now to FIG. 4, the port air flow passing through the port air conduit 46 enters into the port 50 and flows through a nozzle grid 56 into the hollow interior of the rotary kiln 18. As can best be seen in FIG. 5, the nozzle grid 56 includes a series of slots 58 that allow the port air to flow into the open interior of the rotary kiln 18 while preventing the pelletized agglomerate feed stock from failing into the port 50.

Referring back to FIG. 2, each of the port air conduits 46 includes three ports 50 spaced along the length of the conduit 46 that each extend into the interior of the rotary kiln 18. The supply of air flowing through the port air conduit 46 is controlled by an inlet valve, such as a conventional tipper valve 48. The tipper valve 48 is a specialized mechanism that contacts a fixed tipper mechanism (not shown) to open and close the tipper valve 48 as the rotary kiln 18 rotates about its longitudinal axis.

Referring back to FIG. 3, in the preferred embodiment of the invention the tipper valve 48 for each of the port air conduits 46 is configured to open when each of the ports 50 for the port air conduit 46 is beneath the bed 60 of pelletized agglomerate feed stock contained within the rotary kiln 18. As the rotary kiln 18 rotates in the direction shown by arrow 62, the tipper valve 48 for each port air conduit 46 opens at the location indicated by reference character A. At the location indicated by reference character A, the port 50 is beneath the bed 60 of pelletized agglomerate feed stock. As the rotary kiln 18 continues to rotate in the direction shown by arrow 62, a second tipper mechanism closes the tipper valve 48 for the port air conduit 46 when the port air conduit 46 reaches the location indicated by reference character B. In the preferred embodiment of the invention, the tipper valve 48 opens at approximately 180° and closes at approximately 270° when measured in a counter-clockwise direction, as indicated by the reference characters A and B in FIG. 3. In this manner, port air flows into the open interior of the rotary kiln 18 only when each of the ports 50 is beneath the bed 60 of pelletized agglomerate feed stock.

Referring back to FIG. 2, the combination of the first port air zone 28 and the second port air zone 30 are positioned in close proximity to the infeed end 36 and comprise approximately ⅓ of the entire length of the rotary kiln 18. Specifically, the combination of the port air zone 28 and the port air zone 30 extend approximately 26 feet, while the entire rotary kiln 18 has an overall length of 65 feet.

Although the supply of port air is shown as being introduced in two separate port air zones in the preferred embodiment of the invention, it should be understood that a single port air zone that extends the combined length of the first port air zone 28 and second port air zone 30 shown in FIG. 2 could also be used. The pair of port air zones 28 and 30 shown in FIG. 2 are necessitated by the kiln riding ring 51 positioned between the pair of port air zones. In either case, it is important that the supply of port air be introduced beneath the bed of pelletized agglomerate feed stock near the infeed end 36 of the rotary kiln 18.

The port air introduced into both the first port air zone 28 and the second port air zone 30 allows the pelletized agglomerate feed stock entering into the infeed end 36 of the rotary kiln 18 to more efficiently burn the material fuel contained in the pelletized agglomerate feed stock in the parallel flow (co-current) rotary kiln 18. The burning efficiency of the volatile combustibles and fixed carbon in the pelletized agglomerate feed stock is greatly enhanced by strategically introducing the supply of port air from the port air fan 26 into the material bed 60 near the infeed end 36 of the rotary kiln 18. In addition to burning out the fixed carbon in the pelletized agglomerate, the introduction of port air beneath the material bed significantly lowers the external fuel consumption through the burner 20 and increases the ability to achieve some degree of glassifying (vitrification) of the agglomerate which produces in improved product quality.

The amount of port air introduced by the port air fan 26 is selected to accomplish the burning of most of the volatile combustible matter and fixed carbon in the bed 60 of pelletized agglomerate feed stock and to control the bed and gas temperatures. The quantity of port air introduced into each of the port air zones 28 and 30 that is required to burn the volatile combustibles and most of the carbon is in the range of 14–17 SCF of air per pound of dry feed stock. The overall quantity of port air introduced, excluding any lance air introduced through the air lance 22, required for combustion and to control the bed and gas temperature is in the range of 20–26 SCF of air per pound of dry feed material. If the overall material fuel (fixed carbon) in the pelletized agglomerate feed stock increases, the quantity of air needs to be increased to burn the increased material fuel and control the bed and gas temperatures.

In the rotary kiln 18, the burner 20 at the infeed end 36 provides the initial heating and ignition source. As the pelletized agglomerate feed stock enters into the infeed end 36, the burner 20 initially dries the material and causes the burnable, combustible matter to volatize. The port air is introduced into the material bed as the material is being heated near the infeed end 36 by the burner 20. Initially, the port air flows through the bed of material with the volatizing combustible matter and burns exiting the bed. The port air and a small amount of lance air supplied through the air lance 22 provide the combustion air needed to complete the burning of the combustible material above the material bed. The material fuel in the feed stock begins to burn in the material bed as the material temperature rises. The port air then provides the oxygen required to burn the fixed carbon in the feed stock as the bed temperatures approach 1650° F.

In accordance with the preferred operation of the invention, the outer shell of the pelletized agglomerate is first oxidized by the combustion of the material fuel resulting from the introduction of port air near the infeed end 36 of the rotary kiln 18, such as in the first port air zone 28. The introduction of port air burns the carbon and oxidizes the ferrous iron (FeO) to ferric iron or hermatite ($Fe_2O_3$), which raises the fusion temperature of the outer shell. Continued burning of the internal carbon down to 1%–0.05% followed by a slight increase in temperature (±100 ° F.) causes bloating to occur. The interior of each individual piece of pelletized agglomerate has a lower fusion temperature than the oxidized outer shell due to the remaining internal carbon and the presence of ferrous iron (FeO) in the matrix. The interior becomes pyroplastic with the formation of a glass phase at the vitrification temperature. The reaction of the remaining carbon with the iron oxide forms gaseous oxides of carbon (CO and $CO_2$) causing the formation of closed cellular pores within the vitrified, pyroplastic mass and bloating (expansion) of the extrusion to occur.

The introduction of port air continues until the desired amount of carbon is burned and the bed temperature reaches 2050°–2100° F. The material temperature is then allowed to rise to the goal peak temperature of ±2170° F. before decreasing to ±2000° F. as the material flows down the kiln toward the kiln discharge end 64.

The introduction of port air beneath the bed of pelletized agglomerate feed stock in both the first port air zone 28 and the second port air zone 30 act as quasi-burners that burn the combustible material fuel contained in the pelletized agglomerate in the material bed 60. The burning of the combustible material in the bed 60 allows the amount of fuel fed to the burner 20 to be decreased while still transforming the pelletized agglomerate into the same lightweight aggregate at the discharge end 64 of the rotary kiln 18.

When the rotary kiln 18, including the first port air zone 28 and the second port air zone 30, is operated with the optimum flow of port air, the lightweight aggregate produced will be a strong, lightweight, glassy product with a low bulk specific gravity (SSD) and water absorption number. The introduction of port air beneath the bed of material will also result in a lower burner 20 firing rate.

If excess port air is introduced beneath the material bed, the resulting product will be a strong, dense, porous (non-glassy) product with a high bulk specific gravity (SSD) and water absorption number.

If the rotary kiln is operated with a deficient amount of port air, the result will be a lower strength, dense product with a high bulk specific gravity (SSD) and water absorption number. Insufficient port air may result in the development of a reducing condition in the bed, which lowers the material fusion temperature and promotes the potential to form clusters and lumps within the rotary kiln. Formation of clusters and lumps within the rotary kiln can clog the product flow from the infeed end 36 to the discharge end 64. Also, the formation of clusters and lumps contributes to a more rapid material build-up on the lining and promotes ring formation within the rotary kiln 18.

In the preferred embodiment of the invention, the estimated air flow required for combustion of the material fuel in the feed stock is approximately 4800 SCFM and the total air flow for combustion and controlling solids and gas temperature is approximately 7500 SCFM. In the preferred embodiment of the invention, 33% of the port air flows through the first port air zone 28, while 67% of the port air enters into the second port air zone 30. For example, the actual flow of air through the first port air zone 28 is approximately 2000–2500 SCFM while the flow of air through the second port air zone 30 is approximately 3000–5000 SCFM. It should be understood, however, that the actual air flow requirements to the ports will vary depending upon the material fuel content of the pelletized aggregate feed stock fed into the infeed end 36 of the rotary kiln 18.

The lightweight aggregate material leaving the rotary kiln 18 at its discharge end 64 is fed to the cooler 32 where the product temperature is reduced such that the lightweight aggregate can be handled using conventional material handling techniques. The kiln off-gases are vented to atmospheric pollution control equipment 66, and eventually discharged through the gas stack 34.

Ported kiln tests were run, as part of a study to determine the criteria needed for use the design of port air systems for the rotary kiln. Listed below in Table 1 are the pertinent test results.

| Test No. PBK- | Temp.* ° F. | Bulk Density Lbs/Ft3 | Strength Lbs. | Absorption | B. Specific Gravity SSD (Basis) |
|---|---|---|---|---|---|
| Early Air | | | | | |
| 4 | 2172 | 43.19 | 178.7 | 7.74 | 1.35 |
| 7 | 2188 | 47.73 | 216.8 | 21.45 | 1.72 |
| 10 | 2161 | 47.76 | 211.8 | 6.13 | 1.47 |
| Split Air | | | | | |
| 8 | 2124 | 48.69 | 280.2 | 13.06 | 1.66 |
| 11 | 2127 | 52.3 | 320.7 | 9.81 | 1.69 |

The designation of "early air" and "split air" in Table 1 refer to a rotary kiln having either a single port air zone as compared to the two port air zones shown in FIG. 2.

In Test No. PBK-4, with the bed air on for 15 minutes at 18.5 SCFM, the fixed carbon content decreased from 3.93% to 0.05%. The bed temperature peaked at 2091° F. and the slowly dropped to 2075° F. due to the decreasing carbon burning and the cooling effect of the bed air. The temperature increased from 2075° F. to 2172° F. after the bed air was turned off and the extrusions bloated.

In addition to the test results listed above, additional tests were performed in which the supply of port air was eliminated. In the air deficient tests, the individual pellets of the agglomerate feed stock became sticky and formed clusters in the material bed. The excess carbon (bad carbon) in the agglomerates cause contact point melting and retarded bloating within the feed stock. The resulting aggregate at the discharge end of the rotary kiln 18 had a dense, dark interior.

Figure 6:
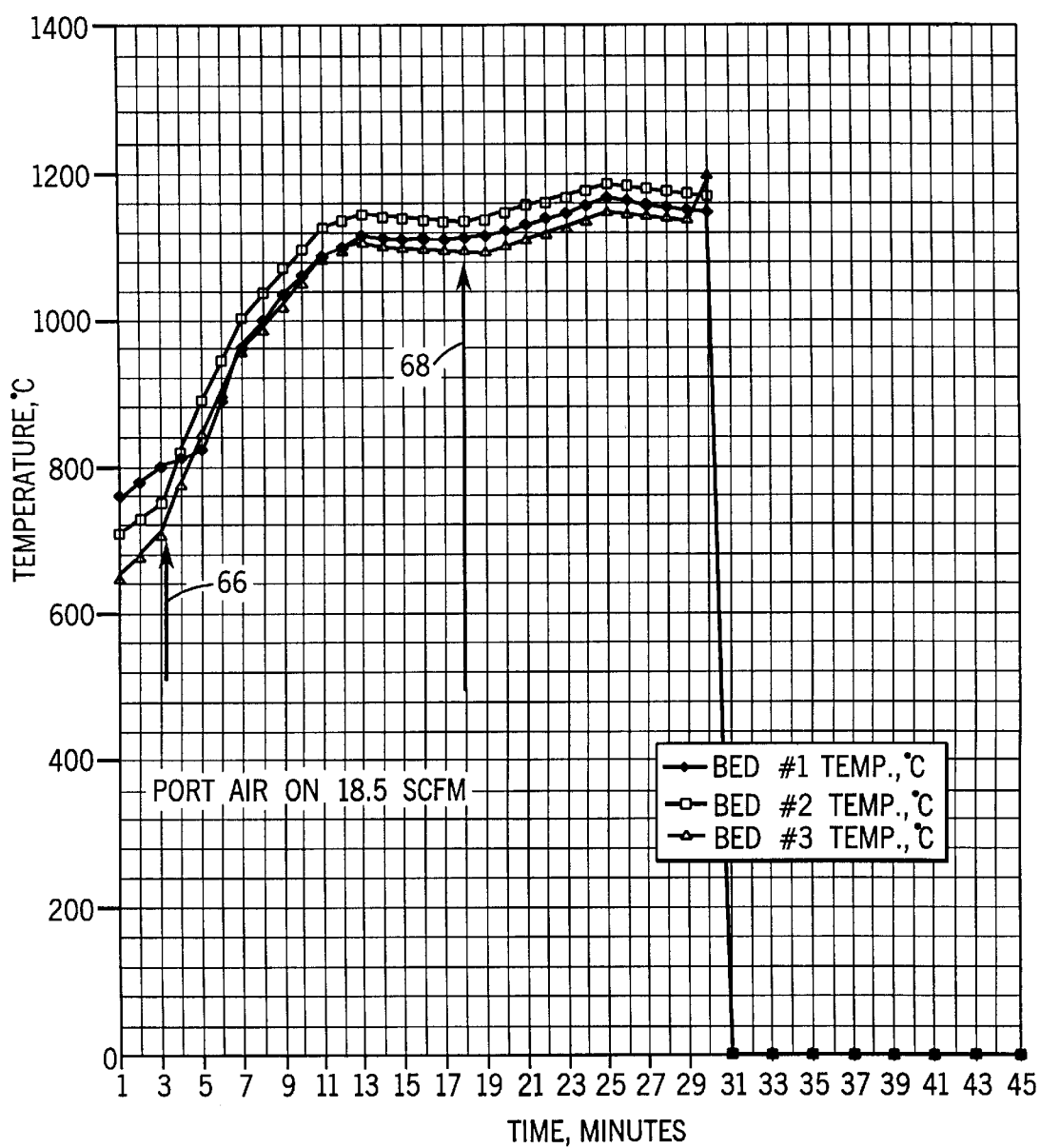
FIG. 6 is a graph illustrating the temperature within the rotary kiln as the pelletized agglomerate feed stock proceeds from the infeed end to the discharge end.

Referring now to FIG. 6, thereshown is the temperature of the bed of feed stock as the feed stock moves from the infeed end 36 to the discharge end 64 of the rotary kiln 18. Port air is supplied beneath the bed during the period of time between the arrows 66 and 68. As can be seen in FIG. 6, the temperature of the bed increases quickly once the port air is turned on and reaches a generally level plateau just before the port air is turned off at the location indicated by arrow 68. After the port air has been turned off, the temperature of the bed increases slightly until the feed stock reaches the discharge end 64 of the rotary kiln 18.

Various alternatives and embodiments are contemplated as being within the scope of the following claims particularly pointing out and distinctly claiming the subject matter regarded as the invention.

I claim:

1. A method of producing a lightweight aggregate comprising the steps of:

receiving a continuous supply of pelletized agglomerate feed stock containing combustible matter at an infeed end of an inclined parallel flow rotary kiln;

rotating the rotary kiln to move the feed stock from an infeed end of the rotary kiln to a discharge end of the rotary kiln;

heating the interior of the rotary kiln with a burner positioned near the infeed end of the rotary kiln; and introducing a supply of port air beneath the feed stock in the rotary kiln, to promote the burning of the combustible matter in the feed stock and transform the feed stock into the lightweight aggregate, the supply of port air being introduced into the rotary kiln near the infeed end of the rotary kiln.

2. The method of claim 1 wherein the pelletized agglomerate feed stock is formed from flyash and sewage sludge.

3. The method of claim 1 wherein the supply of port air is introduced only in the first ⅓ of the rotary kiln.

4. A method of producing a lightweight aggregate comprising the steps of:

receiving a continuous supply of pelletized agglomerate feed stock containing combustible matter at an infeed end of an inclined parallel flow rotary kiln;

rotating the rotary kiln to move the feed stock from an infeed end of the rotary kiln to a discharge end of the rotary kiln;

heating the interior of the rotary kiln with a burner positioned near the infeed end of the rotary kiln;

introducing a supply of port air beneath the feed stock in the rotary kiln to promote the burning of the combustible matter in the feed stock and transform the feed stock into the lightweight aggregate;

providing a port air fan to create the supply of port air; and positioning a series of port air conduits spaced around the outer circumference of the rotary kiln, each port air conduit being in communication with the supply of port air and extending parallel to the longitudinal length of the rotary kiln, each port air conduit having a plurality of ports each extending from the port air conduit into the interior of the rotary kiln to introduce the port air into the rotary kiln.

5. The method of claim 4 further comprising the steps of:

positioning a tipper valve between each port air conduit and the port air fan; and selectively opening and closing each tipper valve as the rotary kiln rotates such that port air enters into the rotary kiln through the port associated with each tipper valve only when the ports are beneath the supply of feed stock.

6. A method of producing a lightweight aggregate comprising the steps of:

receiving a continuous supply of pelletized agglomerate feed stock containing combustible matter at an infeed end of an inclined parallel flow rotary kiln;

rotating the rotary kiln to move the feed stock from an infeed end of the rotary kiln to a discharge end of the rotary kiln;

heating the interior of the rotary kiln with a burner positioned near the infeed end of the rotary kiln; and introducing a supply of port air beneath the feed stock in the rotary kiln to promote the burning of the combustible matter in the feed stock and transform the feed stock into the lightweight aggregate, the port air being introduced into the rotary kiln in a first port air zone and a second port air zone, the second port air zone being spaced from the first port air zone along the longitudinal length of the rotary kiln.

7. The method of claim 6 further comprising the steps of:

providing a port air fan to create the supply of port air;

positioning a series of port air conduits around the circumference of the rotary kiln in the first port air zone, each air conduit in the first port air zone being in communication with the supply of port air and having a plurality of ports each extending from the air conduit into the interior of the rotary kiln; and positioning a series of port air conduits around the circumference of the rotary kiln in the second port air zone, each air conduit in the second port air zone being in communication with the supply of port air and having a plurality of ports each extending from the air conduit into the interior of the rotary kiln.

8. The method of claim 7 further comprising the steps of:

positioning a tipper valve between each port air conduit and the port air fan in both the first port air zone and the second port air zone; and selectively opening and closing each of the tipper valves such that port air enters into the interior of the rotary kiln through the ports associated with each tipper valve only when the ports are beneath the supply of feed stock.

9. The method of claim 8 further comprising the steps of:

positioning a first control damper between the port air fan and the first port air zone;

positioning a second control damper between the port air fan and the second port air zone; and selectively controlling the air dampers to control the amount of port air in the first port air zone and the second port air zone.

10. A method of producing a lightweight aggregate comprising the steps of:

receiving a continuous supply of pelletized agglomerate feed stock containing combustible matter at an infeed end of an inclined rotary kiln;

rotating the rotary kiln to move the supply of feed stock from the infeed end of the rotary kiln to a discharge end of the rotary kiln;

positioning a series of inlet valves along the outer circumference of the rotary kiln, each of the inlet valves being positioned between the supply of port air and at least one port extending into the interior of the rotary kiln;

selectively opening and closing each of the inlet valves such that port air enters into the rotary kiln through the ports only when the ports are beneath the supply of feed stock; and providing a burner at the infeed end of the rotary kiln to heat the interior of the rotary kiln, such that the supply of feed stock and hot gas from the burner move through the rotary kiln in the same direction.

11. The method of claim 10 wherein the inlet valves are distributed in a first port air zone and a second port air zone, the second port air zone being independently operable from the first port air zone.

12. The method of claim 10 wherein the step of introducing port air beneath the supply of feed stock in the rotary kiln causes the feed stock to be the principal source of fuel in the rotary kiln.

13. The method of claim 10 wherein the pelletized agglomerate feed stock is formed from a combination of flyash and sewage sludge.

14. The method of claim 10 wherein each inlet valve is a tipper valve that contacts a tipper mechanism as the rotary kiln rotates to open and close the tipper valve.

15. The method of claim 10 wherein the port air enters into the rotary kiln through the ports in a port air zone positioned near the infeed end of the rotary kiln and having a length of less than 1/3 of the length of the rotary kiln.

* * * * *